(12) United States Patent
Tan

(10) Patent No.: US 9,009,109 B2
(45) Date of Patent: Apr. 14, 2015

(54) PROFILE EXCHANGE METHOD AND SYSTEM

(75) Inventor: Min-Liang Tan, Singapore (SG)

(73) Assignee: Jook, Inc., Carlsbad, CA (US)

( * ) Notice: Subject to any disclaimer, the term of this patent is extended or adjusted under 35 U.S.C. 154(b) by 1001 days.

(21) Appl. No.: 11/969,366

(22) Filed: Jan. 4, 2008

(65) Prior Publication Data
US 2008/0177751 A1    Jul. 24, 2008

Related U.S. Application Data

(63) Continuation-in-part of application No. 11/625,692, filed on Jan. 22, 2007, now Pat. No. 7,817,960.

(51) Int. Cl.
| | | |
|---|---|---|
| *G06F 7/00* | (2006.01) | |
| *G06F 17/30* | (2006.01) | |
| *H04L 29/08* | (2006.01) | |

(52) U.S. Cl.
CPC .... *G06F 17/30699* (2013.01); *G06F 17/30702* (2013.01); *H04L 67/306* (2013.01)

(58) Field of Classification Search
USPC ........... 707/705, 622, 783; 379/156; 709/227; 705/26
See application file for complete search history.

(56) References Cited

U.S. PATENT DOCUMENTS

| | | |
|---|---|---|
| 6,480,885 B1 | 11/2002 | Olivier |
| 7,590,696 B1 | 9/2009 | Odell et al. |
| 7,630,986 B1 | 12/2009 | Herz et al. |
| 7,966,647 B1 | 6/2011 | Igoe et al. |
| 2002/0026452 A1 | 2/2002 | Baumgarten et al. |
| 2002/0055870 A1 | 5/2002 | Thomas |
| 2002/0169650 A1 | 11/2002 | Dougherty et al. |
| 2004/0203363 A1 | 10/2004 | Carlton et al. |
| 2006/0085419 A1* | 4/2006 | Rosen ................................ 707/9 |
| 2006/0126812 A1* | 6/2006 | Carlson et al. ................. 379/156 |
| 2007/0112762 A1* | 5/2007 | Brubaker .......................... 707/5 |
| 2008/0228719 A1* | 9/2008 | Abhyanker et al. ............... 707/3 |

* cited by examiner

*Primary Examiner* — Tony Mahmoudi
*Assistant Examiner* — Tuan-Khanh Phan
(74) *Attorney, Agent, or Firm* — Novak Druce Connolly Bove & Quigg LLP

(57) ABSTRACT

In accordance with a first aspect of the invention, there is disclosed a profile exchange method comprising providing first profile data comprising a first plurality of data elements; receiving exchange signals from a device, the exchange signals carrying exchange data, the exchange data comprising an exchange property; identifying the exchange property as one of an approved property and an unapproved property; and at least one of transmitting first profile signals to and receiving second profile signals from the device in response to the exchange property being an approved property, the first profile signals containing the first profile data and the second profile signals containing a second profile data, the second profile data comprising a second plurality of data elements. More specifically, the exchange property is one of an identifier of the device, a characteristic of the second profile data and one of the second plurality of data elements.

27 Claims, 1 Drawing Sheet

PROFILE EXCHANGE METHOD AND SYSTEM

RELATED APPLICATION

This application is a continuation-in-part of U.S. Ser. No. 11/625,692 filed Jan. 22, 2007, and claims the benefit thereof.

FIELD OF INVENTION

The present invention relates generally to the field of wireless communications. More specifically, the present invention relates to a system and method for wireless networking among different devices.

BACKGROUND OF INVENTION

The rapid pace of development in communications technology has seen wireless communication become an integral part of our lives. A wireless connection, detection or communication involves the linkage of two or more devices, such as cell phones, without the use of physical wires. Wireless communication technology gives users mobility to move around freely within the defined area while still being able to communicate with other wireless devices within the same defined area.

Conventional wireless communication technology connects two or more devices through a common network source. The two or more devices typically allow their users to communicate through voice, text or images. However, in a situation where it is desirable for two users of the devices to positively interact, a human facilitator is usually preferred. The human facilitator will have knowledge of individual profiles such as personal characteristics and preferences about each of the two users. The facilitator then reviews the information and identifies any matches in the personal characteristics and preferences of the two users. If such matches exit, the facilitator then informs the two users about the matches and introduces the two users to each other.

However, in the absence of the human facilitator, interaction between the two or more individual is usually hampered by one individual's lack of profile knowledge of the other individuals and the uncertainty of the other individuals willingness to interact.

Even in with the presence of the human facilitator, interaction is only limited to individuals who are within visual proximity from one another. Additionally, being provided with another person's contact number still does not facilitate the interaction as there is always an uncertainty as to the interaction preference of the other individual or the suitability of the other individual's profile to meet one individual's preference.

There is therefore a need for a system and a method for facilitating interaction between individuals in the absence of a human facilitator and visual proximity.

SUMMARY

In accordance with a first aspect of the invention, there is disclosed a profile exchange method comprising providing first profile data comprising a first plurality of data elements; receiving exchange signals from a device, the exchange signals carrying exchange data, the exchange data comprising an exchange property; identifying the exchange property as one of an approved property and an unapproved property; and at least one of transmitting first profile signals to and receiving second profile signals from the device in response to the exchange property being an approved property, the first profile signals containing the first profile data and the second profile signals containing a second profile data, the second profile data comprising a second plurality of data elements. More specifically, the exchange property is one of an identifier of the device, a characteristic of the second profile data and one of the second plurality of data elements.

In accordance with a second aspect of the invention, there is disclosed a device-readable medium having stored therein a plurality of programming instructions, which when executed on a device, the instructions cause the device to provide first profile data comprising a first plurality of data elements; receive exchange signals from a device, the exchange signals carrying exchange data, the exchange data comprising an exchange property; identify the exchange property as one of an approved property and an unapproved property; and at least one of transmit first profile signals to and receive second profile signals from the device in response to the exchange property being an approved property, the first profile signals containing the first profile data and the second profile signals containing a second profile data, the second profile data comprising a second plurality of data elements. More specifically, the exchange property is one of an identifier of the device, a characteristic of the second profile data and one of the second plurality of data elements.

In accordance with a third aspect of the invention, there is disclosed a profile exchange system comprising means for providing first profile data comprising a first plurality of data elements means for receiving exchange signals from a device, the exchange signals carrying exchange data, the exchange data comprising an exchange property; means for identifying the exchange property as one of an approved property and an unapproved property; and means for at least one of transmitting first profile signals to and receiving second profile signals from the device in response to the exchange property being an approved property, the first profile signals containing the first profile data and the second profile signals containing a second profile data, the second profile data comprising a second plurality of data elements. More specifically, the exchange property is one of an identifier of the device, a characteristic of the second profile data and one of the second plurality of data elements.

DETAILED DESCRIPTION

With reference to the drawings, preferred embodiments of the present invention for providing a system and a method for facilitating interaction between individuals in the absence of a human facilitator and visual proximity are described hereinafter.

For purposes of brevity and clarity, description of the invention is limited hereinafter to a system and method for facilitating interaction between individuals in the absence of a human facilitator and visual proximity. This however does not preclude various embodiments of the invention from other applications that require a similar operating performance. Functional and operational principles upon which embodiments of the invention are based on remain the same throughout the various embodiments.

The system comprises a unit, such as a dongle, that is adapted for connection to an audio device, a telecommunication device, a personal digital assistant (PDA) or a similar device. The device is preferably standalone and includes an interface for receiving the unit. Alternatively, the unit is integrated with the device having at least one of audio playback, telecommunication or personal digital assistant (PDA) functionalities.

Figure 1:
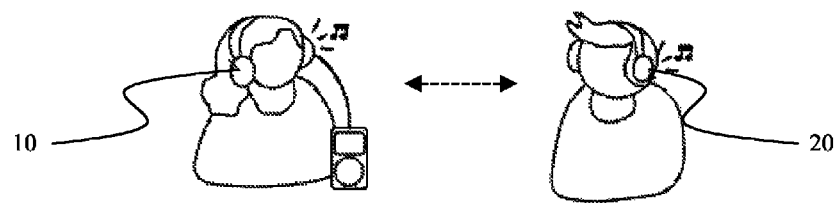
FIG. 1 shows two users exchanging individual profiles wirelessly through their respective devices.

As shown in FIG. 1, a first unit and a second unit are integrated with a first device 10 and a second device 20 respectively, according to a preferred embodiment of the invention. The first and second devices 10, 20 are originally communicatively incompatible. The integration of the unit with each of the first and second devices 10, 20 allows wireless communication to be established between the two devices 10, 20.

The user of the first device 10 initiates exchange of information with the user of the second device 20 via initiation signaling. This involves transmission of exchange signals from the first device 10 to the second device 20 and the reception of the exchange signals by the second device 20 or vice versa. The exchange signals carry exchange data that comprises an exchange property, which is identifiable as one of an approved or unapproved property. The exchange signals may or may not contain full information.

In a first situation, the user of the first device 10 requests information from the user of the second device 20. In particular, the first device 10 contains a first profile data that is transmitted to the second device 20 as first profile signals for requesting information from the second device 20. The first profile data corresponds to a first data field that comprises a first plurality of data elements. The second device 20 contains a second profile data that corresponds to a second data field. The second profile data comprises a second plurality of data elements.

The exchange signals contain at least some basic identification, such as an identifier for initiating the exchange. The identifier may or may not contain preference information for exchange approval. Examples of the exchange property include an identifier of the first or second devices 10, 20, a characteristic of the second profile data or one of the second plurality of data elements. The characteristic of the second profile data includes data format of the second profile data, size of the second profile data or quantity of the second plurality of data elements.

In particular, the first plurality of data elements relates to information associated with the first user and the second plurality of data elements relates to information associated with the second user.

Upon receiving the exchange signal by the second device 20, there may or may not be additional verification steps to be conducted by the second device 20. The second device 20 then transmits profile availability signals to the first device 10. The profile availability signals preferably carry at least an availability indicator recognizable by the first device 10, the characteristic of the first profile data or one of the first plurality of data elements.

The second device 20 has a plurality of allowable properties. The exchange property from first device 10 is then compared with the plurality of allowable properties. The exchange property is subsequently identified as the approved property if the exchange property matches with one of the plurality of allowable properties.

In response to the exchange property being an approve property, the second profile data of the second device 20 is transmitted to the first device 10 as a third profile signal. Alternatively, the exchange of information will be approved for all except user of a certain preference. The preference is reflected as the first profile data in the first device 10.

Exchange of information could be preceded by the second device 20 encrypting the second profile data. The second device 20 then converts the encrypted second profile data into the second profile signals prior to transmission to the first device 10. The first device 10 then receives the encrypted second profile signals as encrypted first profile data. The encrypted first profile data is subsequently decrypted.

Request for profile could also include a requisite format to make sure that key data fields are included and that redundant data fields are excluded. Alternatively, the data elements are filtered subsequent to being received on the respective devices.

In another situation, exchange of information involves the user of the second device 20 initiating a request for information from the user of the first device 10. Similar to the foregoing description, the second profile with the first plurality of data elements is transmitted from the second device 20 to the first device 10 in response to the exchange property being an approved property.

In situation where the received information by the first device 10 from the second device 20 is a short profile data that is incomplete based on a pre-determined set of identifier element such as data fields, the information must contain the necessary information or clues (e.g. identifier, pseudo names, data format, address). This is to enable retrieval of information by the first device 10 from a dedicated database containing long profile data on a network or from multiple nodes (representing devices or websites like flickrs or facebook) where the necessary information is obtainable.

The short profile data is indicative of at least data format of the short profile data or location of the dedicated database on the network. Examples of the short profile data include contact details, preferences and bio-data of the user of the second device 20.

Additionally, the short profile data has metadata that comprises at least an encryption key or information on encryption format of the long profile data. In particular, the metadata being descriptive of at least the data format of the short profile data or data format of the long profile data.

The short profile data is preferably processed to identify the user of the second device 20 as one of an acceptable user and an unacceptable. The short profile data of the user of the second device 20 is discarded if the user upon identifying the user of the second device 20 is identified as an unacceptable user.

The long profile data from the dedicated database is provided with a plurality of required data fields. More specifically, each of the plurality of data elements of the long profile data being associated with one of the plurality of source data fields. The first device 10 subsequently retrieves at least one of the plurality of data elements with at least one of the plurality of source data fields corresponding with at least one of the plurality of required data fields.

The information is located based on at least one of the identifier, the data format of the short profile data and the location of the dedicated database on the network or the long profile data that comprises a plurality of data elements. More specifically, the location of the information involves a search for at least one of a plurality of nodes of the network based on at least one of the identifier and the data format of the short profile data for retrieval of at least one of the plurality of data elements of the long profile data therefrom.

The first device 10 subsequently retrieves the plurality of data elements upon the dedicated database being located on the network. The second profile data of the first user 10 is then updated with at least one of the contact details, preferences and bio-data of the user of the second device 20.

More specifically, the retrieval of information may be done via a personal computer or dedicated base station that points to or is in communication with the first device 10. The personal computer or base station is in data communication with the first device 10 hosting. Based on the pre-determined set of data fields, the empty data fields are populated (or most of them) with information retrieved from the dedicated database on the network. There will be instances where not all the data fields can be completely populated.

Additionally, should certain data fields on the dedicated database be empty but correlates to the data field of the data element contained in the second device 20, for example the pseudo names and contact number correlating to an identifier which are received during the initial handshake or data exchange, the device may reverse update the fields on the dedicated database on the network. This is on condition that the data fields are flagged as updateable on the network.

Figure 2:
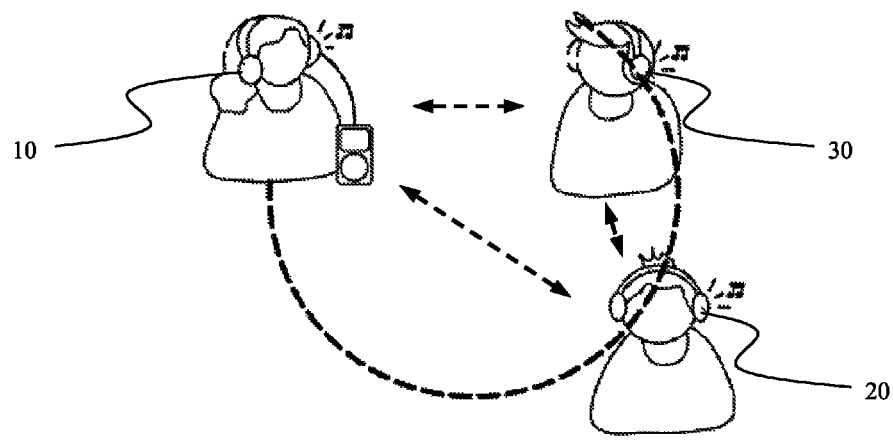
FIG. 2 shows three users exchanging individual profiles wirelessly through their respective devices, the first two users exchanging their individual profiles via the third user.

As shown in FIG. 2, the handshake, verification, data exchange and update of the first and second devices 10, 20 may be done on the go and via one or more third device 30 between the communicating first and second devices 10, 20.

In the foregoing manner, embodiments of a system and a method for facilitating interaction between individuals in the absence of a human facilitator and visual proximity are described. Although the present invention has been described with reference to particular embodiments, it will be apparent to one skilled in the art in view of this disclosure that numerous changes and/or modifications can be made without departing from the scope and spirit of the invention.

What is claimed is:

1. A profile exchange method for facilitating communication between a first user and a second user, the method comprising:
    providing first profile data belonging to a first device, the first device being used by the first user, the first profile data comprising a first plurality of identifier data elements for wireless networking;
    receiving exchange signals from the first device by a second device, the second device being used by the second user, the exchange signals carrying exchange data, the exchange data comprising an exchange property;
    identifying the exchange property as one of an approved property and an unapproved property; and
    receiving second profile data from the second device by the first device in response to the exchange property being an approved property, the second profile data comprising an incomplete profile data of the second user, the incomplete profile data comprising a second plurality of identifier data elements,
    the first plurality of identifier data elements being information associated with the first user and the second plurality of identifier data elements being information associated with the second user,
    the second plurality of identifier data elements indicative of a substantially complete profile data of the second user on a network database or multiple network nodes;
    searching for at least one of the network database or the multiple network nodes based on at least one of the second plurality of identifier data elements;
    retrieving at least one of the plurality data elements from the complete profile data of the second user from the network database or the multiple network nodes by the first device;
    updating the second profile data on the first device with the retrieved data elements from the complete profile data in the network database or the multiple network nodes to further populate incomplete profile data of the second user in the first device.

2. The profile exchange method as in claim 1, the exchange data further comprising:
    at least one of a request for being provided the first profile data and a request for providing the second profile data.

3. The profile exchange method as in claim 1, receiving exchange signals from the first device comprising:
    transmitting profile availability signals receivable by the first device from the second device in response to the exchange signals being received by the second device.

4. The profile exchange method as in claim 3, the profile availability signals carrying at least one of an availability indicator recognizable by the first device, a characteristic of the first profile data and one of the first plurality of identifier data elements.

5. The profile exchange method as in claim 1, identifying the exchange property as one of an approved property and an unapproved property comprising:
    providing a plurality of allowable properties;
    comparing the exchange property with at least one of the plurality of allowable properties; and
    identifying the exchange property as an approved property upon the exchange property matching one of the plurality of allowable properties.

6. The profile exchange method as in claim 1, further comprising:
    encrypting the second profile data prior to transmission from the second device to the first device.

7. The profile exchange method as in claim 6, further comprising:
    decrypting the encrypted second profile data subsequent to the first device receiving the encrypted second profile data.

8. A non-transitory device-readable medium having stored therein a plurality of programming instructions, which when executed on a first device being used by a first user, the instructions cause the first device to:
    provide first profile data comprising a first plurality of identifier data elements for wireless networking;
    transmit exchange signals to a second device used by a second user, the exchange signals carrying exchange data, the exchange data comprising an exchange property; and
    receive second profile data from the second device in response to the exchange property being identified by the second device as an approved property, the second profile data comprising an incomplete profile data of the second user, the incomplete profile data comprising a second plurality of identifier data elements,
    the first plurality of identifier data elements being information associated with the first user and the second plurality of identifier data elements being information associated with the second user,
    the second plurality of identifier data elements indicative of a substantially complete profile data of the second user on a network database or multiple network nodes;
    search for at least one of the network database or the multiple network nodes based on at least one of the second plurality of identifier data elements;
    retrieve at least one of the plurality data elements from the complete profile data of the second user from the network database or the multiple network nodes;
    update the second profile data on the first device with the retrieved data elements from the complete profile data in the network database or the multiple network nodes to further populate incomplete profile data of the second user in the first device, wherein execution of instructions on the first device is initiated by the first user.

9. The non-transitory device-readable medium as in claim 8, the exchange data further comprising:
at least one of a request for being provided the first profile data and a request for providing the second profile data.

10. The non-transitory device-readable medium as in claim 8, the plurality of programming instructions, which when executed, cause the first device further to:
receive profile availability signals transmitted by the second device in response to the exchange signals being received by the second device.

11. The non-transitory device-readable medium as in claim 10, the profile availability signals carrying at least one of an availability indicator recognizable by the first device, a characteristic of the first profile data and one of the first plurality of data elements.

12. The non-transitory device-readable medium as in claim 8, the plurality of programming instructions, which when executed, cause the first device further to:
provide a plurality of allowable properties;
compare the exchange property with at least one of the plurality of allowable properties; and
identify the exchange property as an approved property upon the exchange property matching one of the plurality of allowable properties.

13. The non-transitory device-readable medium as in claim 8, wherein the second profile data is encrypted prior to transmission from the second device to the first device.

14. The non-transitory device-readable medium as in claim 13, the plurality of programming instructions, which when executed, cause the first device further to:
decrypt the encrypted second profile data subsequent to the first device receiving the encrypted second profile data.

15. A profile exchange system for facilitating communication between a first user and a second user, the system comprising:
means for providing first profile data belonging to a first device, the first device being used by the first user, the first profile data comprising a first plurality of identifier data elements for wireless networking;
means for receiving exchange signals from the first device by a second device, the second device being used by the second user, the exchange signals carrying exchange data, the exchange data comprising an exchange property;
means for identifying the exchange property as one of an approved property and an unapproved property; and
means for receiving second profile data from the second device by the first device in response to the exchange property being an approved property, the second profile data comprising an incomplete profile data of the second user, the incomplete profile data comprising a second plurality of identifier data elements,
the first plurality of identifier data elements being information associated with the first user, the second plurality of identifier data elements being information associated with the second user,
the second plurality of identifier data elements indicative of a substantially complete profile data of the second user on a network database or multiple network nodes;
means for searching for at least one of the network database or the multiple network nodes based on at least one of the second plurality of identifier data elements;
means for retrieving at least one of the plurality data elements from the complete profile data of the second user from the network database or multiple network nodes by the first device;
means for updating the second profile data on the first device with the retrieved data elements from the complete profile data in the network database or the multiple network nodes to further populate incomplete profile data of the second user in the first device.

16. The profile exchange system as in claim 15, the exchange data further comprising:
at least one of a request for being provided the first profile data and a request for providing the second profile data.

17. The profile exchange system as in claim 15, the means for receiving exchange signals from the first device comprising:
means for transmitting profile availability signals receivable by the first device from the second device in response to the exchange signals being received by the second device.

18. The profile exchange system as in claim 17, the profile availability signals carrying at least one of an availability indicator recognizable by the first device, a characteristic of the first profile data and one of the first plurality of identifier data elements.

19. The profile exchange system as in claim 15, the means for identifying the exchange property as one of an approved property and an unapproved property comprising:
means for providing a plurality of allowable properties;
means for comparing the exchange property with at least one of the plurality of allowable properties; and
means for identifying the exchange property as an approved property upon the exchange property matching one of the plurality of allowable properties.

20. The profile exchange system as in claim 15, further comprising:
means for encrypting the second profile data prior to transmission from the second device to the first device.

21. The profile exchange system as in claim 20, further comprising:
means for decrypting the encrypted second profile data subsequent to the first device receiving the encrypted second profile data.

22. The profile exchange method as in claim 1, further comprising transmitting first profile signals from the first device to the second device, the first profile signals containing the first profile data.

23. The profile exchange method as in claim 22, wherein at least one of the first profile data and the second profile data comprises a requisite format adapted to include key data fields and exclude redundant data fields.

24. The non-transitory device-readable medium as in claim 7, the plurality of programming instructions, which when executed, cause the first device further to:
transmit first profile signals to the second device, the first profile signals containing the first profile data.

25. The non-transitory device-readable medium as in claim 24, wherein at least one of the first profile data and the second profile data comprises a requisite format adapted to include key data fields and exclude redundant data fields.

26. The profile exchange method as in claim 15, further comprising:
means for transmitting first profile signals from the first device to the second device, the first profile signals containing the first profile data.

27. The profile exchange method as in claim 26, wherein at least one of the first profile data and the second profile data comprises a requisite format, the requisite format adapted to include key data fields and exclude redundant data fields.

* * * * *